R. H. BOWMAN.
STEERING GEAR FOR MOTOR VEHICLES.
APPLICATION FILED OCT. 30, 1907.
935,293.
Patented Sept. 28, 1909.
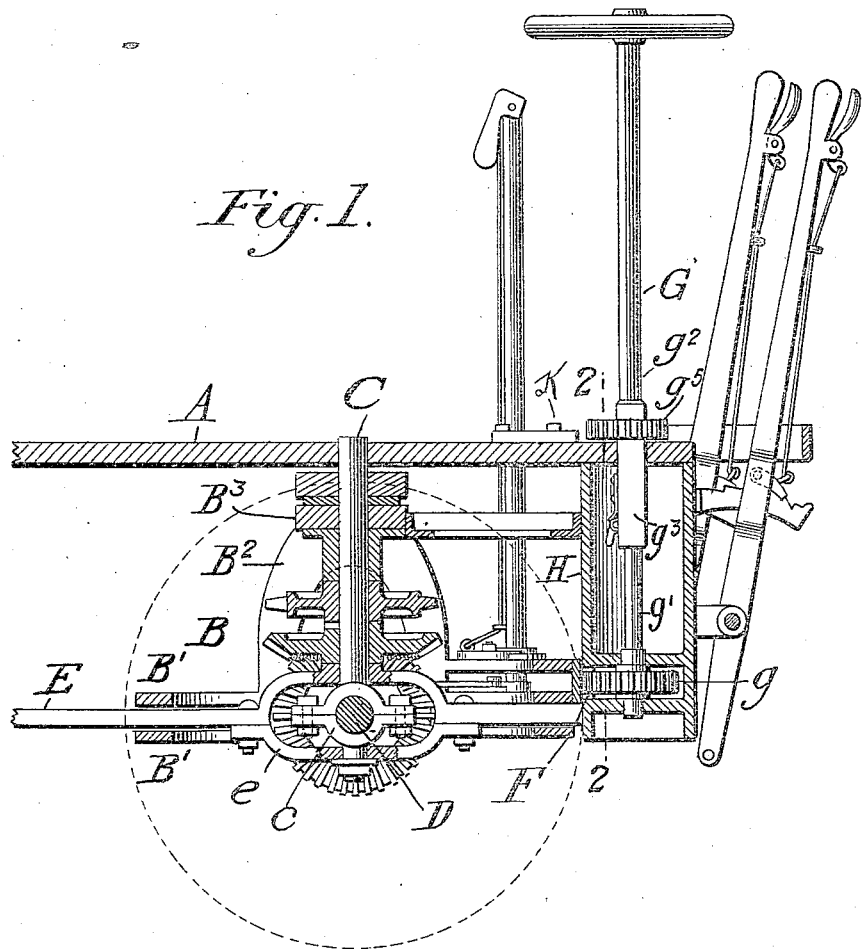

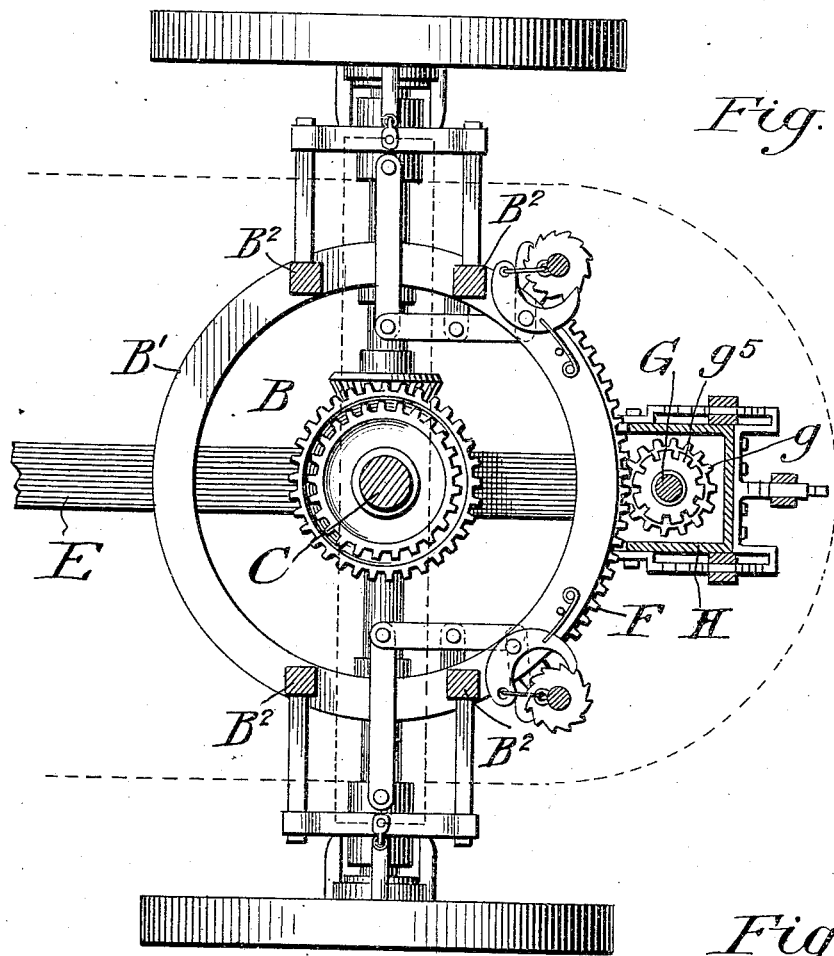
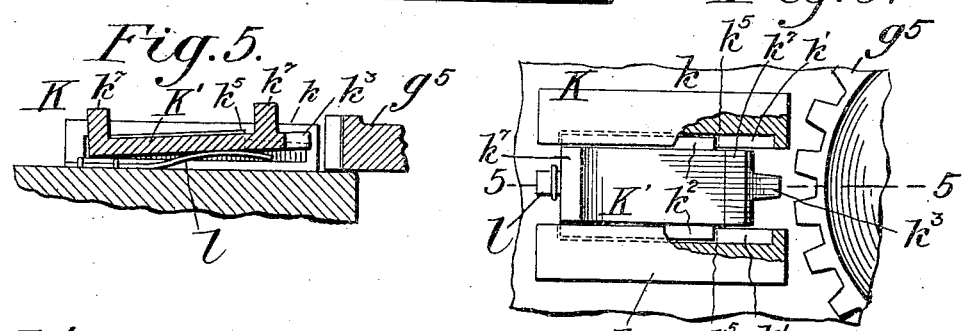

UNITED STATES PATENT OFFICE.

ROBERT HENRY BOWMAN, OF CANON CITY, COLORADO.

STEERING-GEAR FOR MOTOR-VEHICLES.

935,293.

Specification of Letters Patent. Patented Sept. 28, 1909.

Application filed October 30, 1907. Serial No. 399,908.

*To all whom it may concern:*

Be it known that I, ROBERT HENRY BOWMAN, a citizen of the United States, residing at Canon City, county of Fremont, State of Colorado, have invented certain new and useful Improvements in Steering-Gear for Motor-Vehicles; and I do hereby declare the following to be a full, clear, and exact description of the invention, such as will enable others skilled in the art to which it appertains to make and use the same.

My invention relates to steering mechanism for motor vehicles and the object of the invention is to provide an improved means for locking the steering shaft in its adjusted position.

A further object is to provide a steering shaft in two telescopic extensible sections.

These objects I accomplish by the construction shown in the accompanying drawings, in which:—

Figure 1 is a central vertical longitudinal section through the forward truck of a motor vehicle with my improved steering mechanism applied. Fig. 2 is a detail sectional view on line 2—2 of Fig. 1. Fig. 3 is a detail section on line 3—3 of Fig. 2. Fig. 4 is a sectional plan of the construction shown in Fig. 1. Fig. 5 is a section on line 5—5 of Fig. 6, and Fig. 6 is a detail plan view of the locking mechanism shown in Fig. 5.

A, designates a portion of the vehicle platform, and B, is the forward truck comprising the spaced circular plates B' B' at opposite sides of which are the standards $B^2$ $B^2$ connected at their upper ends by the cross piece $B^3$. The axis of the truck B, is formed by the king bolt C which is clipped at its lower end to the axle D, as shown at $c$.

The reach E, is pivotally connected at its forward end to the king bolt C by a yoke like connection $e$ as shown in Fig. 1.

F, is a circular rack secured to the forward edge of the truck, see Figs. 1 and 4, and with this rack meshes a pinion $g$, on the lower end of the steering shaft G.

The steering shaft G, is mounted in a vertical box H, depending from the forward end of the platform A. In the lower end of this box H, are two spaced partitions $h$, $h$, which form a chamber for the pinion $g$ which projects through the rear open side of said chamber. These partitions $h$, $h$, form bearings for the lower end of the steering shaft.

The shaft G comprises a lower section $g'$ within the box H, and an upper section $g^2$ having a rectangular box-like sleeve $g^3$, on its lower end which slides over the upper squared end of the section $g'$, see Figs. 1, 2 and 3. The squared upper end of the shaft section $g'$ is provided with downwardly inclined ratchet teeth $g^4$, and the sleeve $g^3$ carries a pivoted spring pressed pawl $g^5$, the upper end of which extends through a slot in the sleeve and into engagement with the teeth $g^4$. The sleeve $g^3$ may thus be engaged with the section $g'$ regardless of the thickness of the platform A. Above the platform the shaft section $g^2$ is provided with a circular rack wheel $g^5$. In the rear of this rack wheel $g^5$ a foot-latch K is secured to the platform A. This foot-latch K comprises a slotted casing $k$, having guide grooves $k'$, $k'$ in the adjacent side walls of the slot within which grooves $k'$ slide the guide ribs $k^2$, $k^2$, on the opposite side of the bolt or latch K'. The bolt K' has a nose $k^3$ to engage the rack $g^5$ and lock it and so hold the steering shaft in its adjusted position. The guide grooves $k'$, $k'$ are inclined upwardly and forwardly for a portion of their length so as to form the shoulders $k^5$ $k^5$, against which the forward ends of the guide ribs $k^2$, $k^2$, are pressed by the plate spring $l$, when the bolt is in its retracted position, as best shown in Fig. 5.

The bolt K is further provided with upwardly extending lugs $k^7$ which project above the plane of the casing $k$, so as to be engaged by the foot of the operator. By pressing down on these lugs $k^7$ with the foot the bolt will be freed from the shoulders $k^5$ whereupon it may be slid forward to lock the rack $g^5$.

The clutch mechanism and reach and king bolt mechanisms are embraced in other applications forming divisions hereof and are not therefore claimed herein.

What I claim is:—

1. In a steering mechanism for motor vehicles, a steering shaft provided with a rack wheel, and a sliding foot latch mounted to slide longitudinally on the vehicle platform, adapted to be thrown by the operator's foot into locking engagement with said rack.

2. In a steering mechanism for motor vehicles, a steering shaft provided with a rack wheel, and a foot latch comprising a casing adapted to be secured to the vehicle platform and having shouldered grooves, a bolt having guide ribs working in said grooves and exposed lugs for the operator's foot, and a spring pressing upwardly on the under side of the bolt.

3. In a steering mechanism for motor vehicles, a rack connected with the forward truck, a vertical steering shaft extending down through the vehicle platform and provided with a pinion meshing with said rack, a locking rack wheel on the shaft above the platform and a sliding foot latch mounted to slide longitudinally on the platform to engage the said locking wheel.

4. In a telescopic steering mechanism for motor vehicles, a steering shaft comprising an upper outer section, a lower inner section, downwardly inclined rack teeth on the inner section and a spring pressed pivoted pawl on the outer section engaging said teeth with its upper end.

5. The combination with a motor vehicle having a turning forward truck and a rack thereon, of a depending bearing on the vehicle platform, a vertically extensible shaft mounted in said bearing and having a pinion on its lower member engaging said rack, a locking rack wheel on the upper member of the shaft above the platform and a foot latch on the platform accessible for direct actuation by the foot of the operator to lock and release said locking wheel.

In testimony whereof I affix my signature, in presence of two witnesses.

ROBERT HENRY BOWMAN.

Witnesses:
  H. E. CHAMPION,
  H. S. M. GUOM.